June 17, 1930. V. GENKIN 1,764,399
PROTECTIVE SYSTEM
Filed Dec. 23, 1924
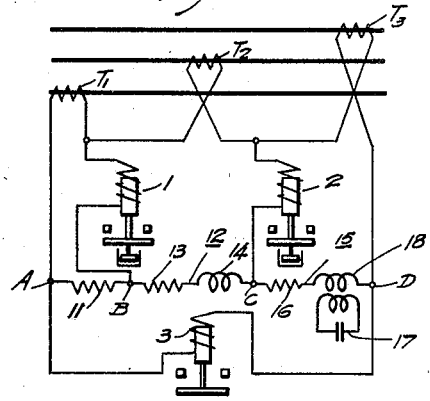
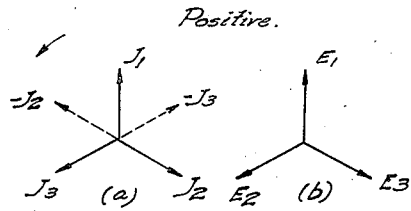
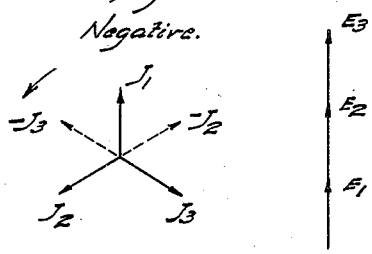
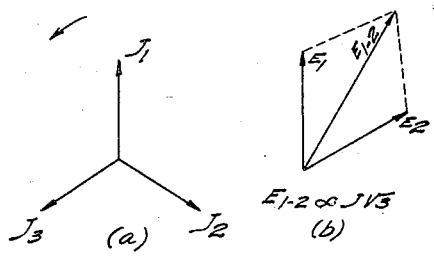
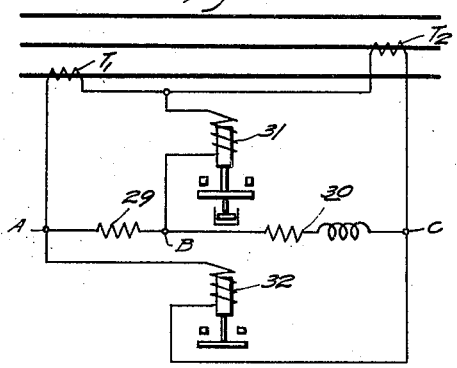
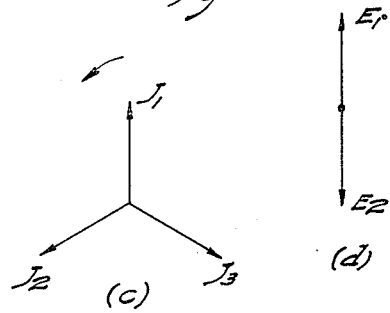
INVENTOR
Vladimir Genkin.
BY
ATTORNEY Patented June 17, 1930

1,764,399

UNITED STATES PATENT OFFICE

VLADIMIR GENKIN, OF MARSEILLE, FRANCE

PROTECTIVE SYSTEM

Application filed December 23, 1924, Serial No. 757,619, and in Belgium January 18, 1924.

My invention relates to protective systems and particularly to relay protective systems for unbalanced polyphase circuits.

The object of my invention is to provide a protective system for polyphase circuits that is effective against short-circuits or grounded conductors in which the relays are arranged singly or differentially in such manner that one or more of the relays will be operated under the sole influence of the unbalancing of the currents in the aforesaid circuit.

The advantage of an arrangement responsive to the unbalancing of the currents in a polyphase circuit is that, notwithstanding the employment of ordinary relays, a time element may be obtained that is very different in the case of an overload than in the case of a fault.

The differential connections based upon the same principle of current unbalance applied to the protection of lines presents the advantage of insuring a complete protection against either short-circuits or grounded conductors with a smaller number of relays and pilot wires than in the differential relay systems in actual use heretofore.

Finally, the use of a directional wattmeter relay utilizing the symmetrical components of voltage and of current in an unbalanced system reduces the number of relays to one only, while insuring a correct operation in the event that a fault occurs even in the immediate proximity of the relay.

It is known that, under normal conditions, the currents traversing a polyphase circuit form a substantially symmetrical system of vectors. The presence of a fault on the circuit manifests itself in the formation of an abnormal unbalancing of the currents frequently accompanied by a distortion of the voltages. If the fault results from a short-circuit between phases, or involves an abnormal flow of current in one phase, without any ground current, the sum of the currents in the lines remains zero in spite of their dis-symmetry. On the other hand, in the case of a fault accompanied by a grounded conductor, the vector sum of the currents in the lines differs from zero. In the last-mentioned case, which is the most general case, the sum of the currents in the lines is numerically equal to the value of the current escaping to ground and traversing the phase of which the insulation from ground is defective.

One may assume then that, whatever be the nature of the fault, the unbalance of the currents in the conductors that it involves is the result of the superposition of a ground current in one phase and the sum of the unbalanced currents of which the vector sum is always zero. But all unbalanced systems of currents of which the vector sum is zero may be replaced by two symmetrical or balanced systems of opposite phase-sequence, of which the system of counter-rotational or negative phase-sequence appears only in so far as an unbalanced condition exists.

A protective system based upon this unbalance principle may be made responsive to the counter-rotational or negative phase-sequence component and to the current flowing in the ground as the return conductor. On the other hand, it may be so arranged as to be not influenced by the normal or positive phase-sequence system of currents.

In order to insure the protection of polyphase systems the present invention is particularly directed to the application of certain connections or selective networks responsive to the unbalancing of the current, as shown in the accompanying drawing. The invention will be described, by way of example, in its application to three-phase systems, although the principles are equally applicable to systems of any number of phases.

In the accompanying drawing, Figure 1 is a diagrammatic view of a protective system embodying my invention;

Figs. 2 and 3 are vector diagrams illustrating the principles utilized by the invention, particularly with reference to Fig. 1, Fig. 4 is a diagrammatic view of a modification of the invention, and Figs. 5 and 6 are vector diagrams with reference to Fig. 4.

Referring to Fig. 1, according to the first arrangement to be described, the secondary circuits of three current transformers $T_1$, $T_2$ and $T_3$ in the three conductors of a three-phase circuit contain three impedances 11, 12 and 15 of equal absolute values. The first impedance 11 comprises a non-inductive resistor. The second impedance 12 comprises a non-inductive resistor 13 and a reactor 14, and the third impedance 15 comprises a resistor 16, a transformer 18 and a condenser 17. The values of the reactor 14 and the condenser 17 are so chosen that the phase of the current traversing the circuit BC lags 60° and that traversing the circuit CD leads 60° with respect to the voltages across the respective terminals. The voltage between the terminals AB is in phase with the current. The connections to the secondary windings of the transformers $T_2$ and $T_3$ are crossed, as indicated in the drawing. The condenser is inserted in the circuit CD through the instrumentality of a transformer 18 having any convenient ratio of transformation.

The voltage between the terminals A and D is the vector sum of $E_1$, $E_2$ and $E_3$, the voltages between the terminals of the three circuits AB, BC and CD. This voltage disappears for an assumed sequence of phases, when the system is balanced, according to the diagram shown in Fig. 2, where the voltages $E_1$, $E_2$ and $E_3$ correspond to the secondary currents $J_1$, $J_2$ and $J_3$.

As will be seen in vector diagram (b) of Fig. 2, the reversal of the current transformers $T_2$ and $T_3$ throws the current vectors $J_2$ and $J_3$ upwardly 180° out of their normal positions. Since the network BC is an inductive one, the voltage BC or $E_2$ will lead the corresponding current $J_2$ in its reversed position. $E_2$ will, therefore, be advanced to a position 120° leading $E_1$. Similarly since the network CD is a condenser reactive one, its current will lead the voltage, and the voltage $E_3$ will, therefore, lag 60° behind the reverse vector $J_3$ which will place the vector $E_3$ 120° from both $E_1$ and $E_2$. Thus, for that phase rotation which in this case would be positive, the voltages will all balance and there will be no potential difference between the points A and D.

In Fig. 3 are represented the counter-rotational or negative phase-sequence currents resulting from an unbalanced condition. The total voltage between A and D for the counter-rotational or negative phase-sequence component is three times that of each circuit, $E_1$, $E_2$ and $E_3$ being in phase as shown.

As shown in Fig. 3, the reversal of the current transformers $T_2$ and $T_3$ reverses the vectors $J_2$ and $J_3$ to effective positions, as indicated, each 60° from the vector $J_1$. The leading and lagging relationships are now reversed since the negative phase sequence component is being considered, consequently the voltage vector $E_2$, when disposed 60° in advance of the current vector $J_2$, assumes a position directly in phase with the voltage $E_1$. Similarly voltage $E_3$ lags its reversed current vector $J_3$ by 60° and, consequently, voltage $E_3$ also is in phase with the voltages $E_1$ and $E_2$. Since these three phases are all connected in series relationship they are cumulative in their effect upon the relay.

On the other hand, a ground current derived from any phase involves a corresponding difference of potential between the terminals A and D. It may be concluded that any unbalancing of whatever nature manifests itself by a difference of potential between the terminals A and D.

This arrangement is applicable to the protection of a polyphase circuit against short-circuits or grounded conductors. The over-current relays 1 and 2 traversed by the vector sum of the currents on the lines are retarded in their operation by dash-pot means or other well known relay time-retarding means. On the other hand, the relay 3 functions only in the case of a fault and may be instantaneous in its operation.

According to a third arrangement, when the number of current transformers is limited to two, the arrangement shown in Fig. 4 may be employed. To the secondary terminals A—B and B—C of the transformers $T_1$ and $T_2$ are connected a non-inductive resistor 29 and an impedance 30 of equal absolute values. The values of the resistor and reactor comprising the impedance 30 connected to BC are so chosen, as before, as to produce a lag of 60° between the voltage across the terminals BC and the current traversing this circuit. From the considerations given above, the voltage between the points A and C is zero for a predetermined phase-sequence and the opposite phase-sequence is proportional to $J\sqrt{3}$ where J is the amplitude of the counter-rotational or negative phase-sequence symmetrical component. The retarded current relay is represented by 31, and 32 is the instantaneous relay. The relay 32 is responsive to any unbalancing resulting from a fault between phases or a ground upon phases 1 and 2. On the other hand, a ground upon phase 3 does not affect this relay.

The remarks with respect to the first arrangement may be made with respect to the arrangement shown in Fig. 4. The vector relationship with reference to Fig. 4 is shown in Figs. 5 and 6, and it is believed to be sufficiently clear to avoid the necessity for a detailed discussion thereof.

Both of the arrangements described heretofore are applicable to differential protective systems with or without pilot wires. The arrangements shown are particularly adapted for use in the so-called "balanced-voltage" differential systems.

The principal advantage of a differential system based upon current unbalance consists in its independence of the useful currents or the parasitic currents, such as charging currents, provided these currents are substantially symmetrical. Furthermore, compared to the differential systems that are in use at the present time, it presents another advantage of requiring only a minimum number of relays or pilot wires while realizing complete protection against all kinds of faults.

I claim as my invention:

1. A protective relay system for polyphase circuits comprising a plurality of current transformers in different phase-conductors of the circuit, time-element relays, a relay having substantially no time element and a series of impedances so connected in the circuits of each of said transformers and relays that the time-element relays are energized in accordance with the magnitude of the current traversing said circuit and the other relay in accordance with the extent of unbalance of the currents in said circuit.

2. A protective relay system for polyphase circuits including a plurality of current transformers in different phase-conductors of the circuit, two relays of different time characteristics responsive thereto, and means, including said transformers having impedances connected across their respective circuits, for actuating one relay in accordance with a symmetrical phase-sequence component of an unbalanced quantity of the circuit exclusive of the zero component and another in accordance with an overload current in the circuit independent of phase-sequence quantities.

3. A protective relay system for polyphase circuits including a plurality of current transformers in different phase-conductors of the circuit, a relay of one time-characteristic and another relay of another time-characteristic responsive thereto, and means, including said transformers and three impedance devices of equal absolute values, for actuating one relay in accordance with a symmetrical phase-sequence component of current from the circuit and another in accordance with an excess circuit-conductor current.

4. The combination with a polyphase circuit of a plurality of current transformers having their secondary circuits cross-connected, means energized thereby in accordance with overloads on said circuit, and means energized from said transformers by phase-sequence components of current in accordance with fault conditions occurring on said circuit.

5. In a protective system for a polyphase circuit, means for eliminating the zero phase-sequence component of an electrical quantity in said circuit, means energized by said means responsive to overloads on said circuit, and means adapted to be energized from first said means substantially instantaneously on the occurrence of a fault on said circuit.

6. In a protective system for a polyphase circuit, differentially connected transforming means for eliminating the zero phase-sequence component of an electrical quantity in said circuit, means energized by said transforming means responsive to overloads on said circuit, an impedance network energized from said transforming means, and means actuated from said net work in accordance with a symmetrical phase-sequence component of an electrical quantity of the said circuit.

In testimony whereof, I have hereunto subscribed my name this twenty-eighth day of November, 1924.

VLADIMIR GENKIN.